(12) United States Patent
Good

(10) Patent No.: US 11,748,066 B1
(45) Date of Patent: Sep. 5, 2023

(54) SYSTEMS AND METHODS FOR DEFINING AND AUTOMATICALLY EXECUTING 2D/3D DATA MANIPULATION WORKFLOWS

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/936,996

(22) Filed: Sep. 30, 2022

(51) Int. Cl.
*G06F 8/34* (2018.01)
*G06F 3/0486* (2013.01)
*G06T 17/10* (2006.01)

(52) U.S. Cl.
CPC .............. *G06F 8/34* (2013.01); *G06F 3/0486* (2013.01); *G06T 17/10* (2013.01)

(58) Field of Classification Search
CPC ........................................................ G06F 8/34
See application file for complete search history.

(56) References Cited

U.S. PATENT DOCUMENTS

2005/0081161 A1* 4/2005 MacInnes ............... G06F 30/13
715/848

OTHER PUBLICATIONS

Meshroom contributors, Meshroom User Manual Release V2021.0.1, alicevision.org, Feb. 6, 2022.

* cited by examiner

*Primary Examiner* — Duy Khuong T Nguyen
(74) *Attorney, Agent, or Firm* — Ansari Katiraei LLP; Arman Katiraei; Sadiq Ansari

(57) ABSTRACT

An editing system and associated methods execute a workflow involving a sequence of two-dimensional/three-dimensional ("2D/3D") data manipulations and/or associated operations to 2D/3D data of different formats by calling functions of different applications that are compatible with the changing format of the 2D/3D data throughout the workflow. The system determines that the 2D/3D data provided as input to a first workflow node is in a first format, and executes the first node by invoking a function of a first application that implements the operations associated with the first node on the 2D/3D data in the first format. Execution of the first node converts the 2D/3D data to a different second format that is passed to a second workflow node. The system executes a second workflow node by invoking a function of a second application that implements the operations associated with the second node on the 2D/3D data in the second format.

20 Claims, 9 Drawing Sheets

SYSTEMS AND METHODS FOR DEFINING AND AUTOMATICALLY EXECUTING 2D/3D DATA MANIPULATION WORKFLOWS

BACKGROUND

Generating high quality two-dimensional ("2D") or three-dimensional ("3D") data may be a time consuming process that involves multiple manipulations and tools. Different 2D or 3D data manipulation tools or applications work with different 2D and 3D image formats, and may produce different results when applying similar manipulations to the data of a different format. For instance, a first tool or application may be used to edit 2D images, a second tool or application may be used to edit 3D polygon based models, and a third tool or application may be used to edit 3D point cloud models. Similarly, a first tool or application may register different laser scans to generate a first point cloud, a second tool or application may perform photogrammetry to generate a second point cloud from a set of 2D images, and a third tool or application may edit the properties of each of the first and second points clouds to generate a consolidated single image.

Further complicating 2D/3D data manipulation is the step-by-step nature by which the process occurs. An artist applies a first manipulation with a first set of settings, and determines if the output produces a desired result before applying a second manipulation with a second set of settings to the output of the first manipulation. The output of each such manipulation may take several seconds or minutes to execute depending on the available computing resources, the complexity of the manipulation, and the amount of 2D or 3D data that is to be processed. Consequently, much of the artist's time is wasted when multiple manipulations are applied to one or more images or when the artist is required to switch between different tools or application to define the manipulations.

DETAILED DESCRIPTION OF PREFERRED EMBODIMENTS

Figure 1:
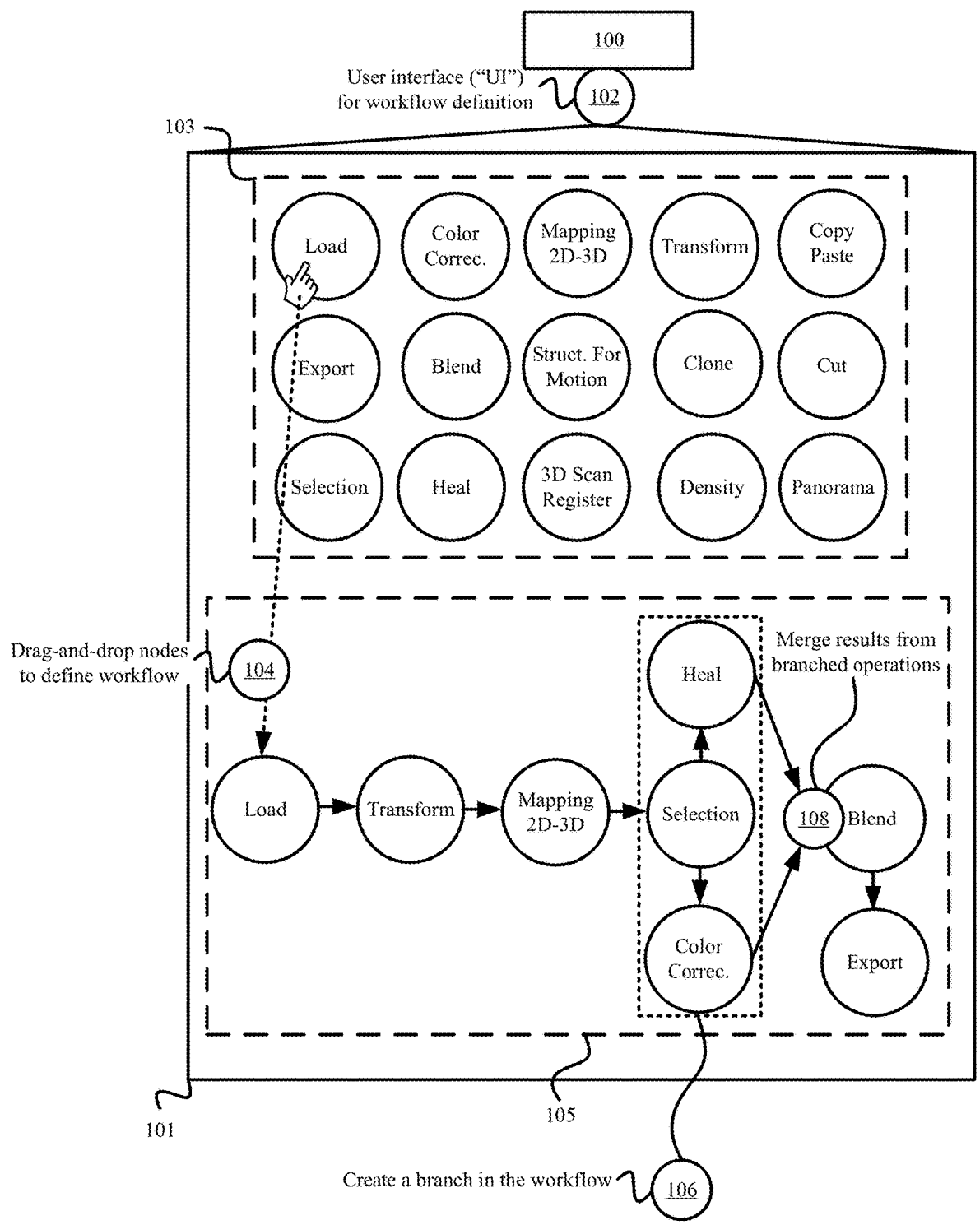
FIG. 1 illustrates an example of defining a two-dimensional/three-dimensional ("2D/3D") data manipulation workflow in accordance with some embodiments presented herein.

The following detailed description refers to the accompanying drawings. The same reference numbers in different drawings may identify the same or similar elements.

Provided are systems and methods for defining and automatically executing workflows that apply a sequence of manipulations and/or associated operations to two-dimensional ("2D") and three-dimensional ("3D") images or 2D/3D data of different formats using the appropriate tools or applications. Each workflow is defined with a set of nodes. Each node corresponds to a different 2D/3D data manipulation or associated operation. An editing system applies each of the 2D/3D data manipulations or associated operations according to the sequencing of nodes in a defined workflow without a user manually selecting the tool or application for each 2D/3D data manipulation or operation, and without the user waiting for the results of an executed manipulation or operation before executing a next manipulation or operation.

The editing system accelerates the workflow execution by recording the 2D/3D data (e.g., image) state after executing each node so that a change made to one node in the workflow does not require the entire workflow to be executed anew and/or from the beginning. Instead, the workflow execution resumes using the 2D/3D data state produced by the node in the workflow that immediately preceded the changed node. The editing system also accelerates the workflow execution by dynamically allocating resources to parallelize the execution of the same 2D/3D data manipulation operation being applied to different 2D/3D data at the same node, or to parallelize the execution of different nodes that branch off the workflow.

In this manner, the editing system removes the limitations of different 2D/3D data or image manipulation tools and/or applications, thereby allowing the user to focus on defining the 2D/3D manipulations that the user wants performed on different formatted 2D/3D data or different image types. Moreover, the editing system allows the user to retain focus on defining the 2D/3D data manipulations rather than perform one 2D/3D data manipulation and wait to see the results of that 2D/3D data manipulation before performing the next 2D/3D data manipulation as is the current usage model of the 2D/3D data manipulation tools and/or applications.

The editing system of some embodiments includes, integrates with, and/or accesses different tools, application programming interfaces ("APIs"), applications, and/or other systems that implement different executable functions for accessing, manipulating, editing, processing, and/or otherwise interacting with 2D/3D data of different types and image formats. For instance, the editing system calls functions of a first API when manipulating pixels or 2D image data, and calls functions of a second API when manipulating data points of a 3D point cloud. The editing system further includes different computing resources and/or devices that execute the functions of the different tools, APIs, applications, and/or other systems. Editing system may dynamically allocate different computing resources based on the complexity of the workflow being executed, and/or to provide computing resources that are optimized for specific operations of the workflow.

FIG. 1 illustrates an example of defining a 2D/3D data manipulation workflow in accordance with some embodiments presented herein. As shown in FIG. 1, editing system 100 provides (at 102) user interface ("UI") 101 with various nodes 103. Nodes 103 may be linked together in different sequences and/or arrangements to define different 2D/3D data manipulation workflows. Each node 103 corresponds to a selectable UI element for defining a different 2D/3D data manipulation operation or associated operation that editing system 100 is to apply to the 2D/3D data at the point in the workflow.

A user drags-and-drops (at 104) and/or otherwise selects and places a subset of nodes in a sequence to define workflow 105. In some embodiments, the user defines the sequence of nodes 103 for workflow 105 programmatically via API calls or a script. The sequence defines the order with which editing system 100 applies the 2D/3D data manipulation operation associated with each selected node 103 to the 2D/3D data.

In addition to a linear or sequential execution of nodes 103, editing system 100 allows for the branching (at 106) and/or parallel execution of different nodes 103. For instance, a branch in workflow 105 may cause a first 2D/3D data manipulation to be applied to one image or a first part of an image and a different second manipulation to be applied to another image or a second part of the image. As shown in FIG. 1, the different results of the 2D/3D data manipulations applied in a branch of workflow 105 are merged (at 108) back to produce a single consolidated result.

Each node 103 may include one or more configurable settings. The user double clicks or otherwise selects a workflow node to access the one or more configurable settings and set the values for any of the settings. The configurable settings allow for the user to customize the effect or impact of the associated 2D/3D data manipulation or operation. In some embodiments, the configurable settings for a particular node may change based on the image data type (e.g., a 2D data format versus a 3D data format) that is to be processed using the 2D/3D data manipulation operations of the particular node. For instance, a first set of settings may be configured for the particular node when applying the associated 2D/3D data manipulation operations to a 2D image format, and a different second set of settings may be configured for the particular node when applying the associated 2D/3D data manipulation operations to a 3D image format.

The UI created by editing system 100 includes a load node for loading image files or image data of different 2D/3D formats. For instance, a load node may be selected and configured to directly load raw image data captured from one or more cameras, scanners, and/or other imaging devices into a workflow for processing. The load node may also be configured to load image files with 2D/3D data in a different processed or encoded format. For instance, the load node may be configured to receive 2D images of different resolutions and/or formats, 3D polygon models of different resolutions and/or formats, and 3D point clouds of different resolutions and/or formats. Accordingly, the load node includes a setting for specifying the location, file path, Uniform Resource Locator ("URL"), and/or other identifier for obtaining the targeted 2D/3D data for the workflow. In some embodiments, the load node loads the targeted 2D/3D data into memory and/or scans the targeted 2D/3D data to determine the data type or data format, and to adjust subsequent nodes of the workflow based on the determined data type or data format.

The UI includes an export node for exporting processed and/or manipulated 2D/3D data that was loaded into editing system 100 in a previously defined load node of the workflow to one or more different 2D/3D formats. The export node includes one or more configurable settings for setting the resolution at which to output the processed and/or manipulated 2D/3D data of the workflow, the format or encoding of the output 2D/3D data, the location at which to store the workflow output, and/or other export operations. For instance, the one or more configurable settings may cause the export node to output the processed 2D/3D data as pixels of a 2D image for a first target system or environment, polygons for a 3D model for a second target system or environment, or data points of a point cloud for a third target system or environment. The i2D/3D data manipulation operations associated with the export node include operations for converting between the different image formats and/or for encoding the processed or manipulated 2D/3D data to the one or more image formats.

The UI includes different nodes for different manipulations of the loaded 2D/3D data. In some embodiments, the 2D/3D data manipulation nodes and the associated manipulations are sourced from two or more 2D/3D data manipulation tools, APIs, or applications. In other words, the 2D/3D data manipulation nodes map to, call, and/or execute 2D/3D data manipulation functions of different tools, APIs, or applications. For instance, a first 2D/3D data manipulation node may call a first function of a first 2D editing application, and a second 2D/3D data manipulation node may call a second function of a second 3D editing application. Editing system 100 automatically selects the correct function, tool, API, or application to call for a given node by tracking the 2D/3D data state at each node. Specifically, the load node inspects the loaded 2D/3D data to determine the image formatting or type, and editing system 100 selects between different functions, tools, APIs, or applications that implement a common 2D/3D data manipulation operation for different image formats or types based on the formatting or type determined at the load node or tracked changes to the image formatting, type, or state at other nodes of the workflow.

The 2D/3D data manipulation nodes include a color correction node. The color correction node includes one or more configurable settings for configuring the color corrections to apply to the 2D/3D data. The color corrections include adjusting the color values (e.g., increasing or decreasing red, green, blue, and/or other color components), brightness, saturation, hue, contrast, gamma, gain, offset, shadows, highlights, exposure, and/or visual aspects of the 2D/3D data. The color correction node settings specify which visual aspect to change and the amount or degree of change.

The 2D/3D data manipulation nodes include cloning, copying, pasting, healing, and cutting nodes. The cloning node overwrites the image data at one part of a file with the 2D/3D data at another part of the same file or a different file. The copying and pasting nodes copy the 2D/3D data from a selected part of one image to another part of the same image or a different image. The healing node corrects imperfections in the 2D/3D data by blending surrounding 2D/3D data together or by reducing the amount of deviation between one set of 2D/3D data and surrounding or neighboring 2D/3D data.

The 2D/3D data manipulation nodes include a structure-for-motion node for generating a 3D object, model, or image from a set of 2D images. The structure-for-motion node performs one or more photogrammetry techniques to create 3D points in space from pixels of 2D images that capture the same point or feature from different locations, angles, or perspectives. One or more settings of the structure-for-motion node provide manual or automatic controls for performing feature matching between two or more 2D image data so that the two or more 2D images may be aligned for more accurate 3D modeling of the object represented in the aligned images. The manual controls include an option to pause the workflow when the structure-for-motion node is reached so that editing system may present the different images taken of the scene to a user and for the user to manually identify common or matching features in the presented images. Editing system 100 may use the identified common or matching features to align the different images in order to generate the 3D model or 3D image from the aligned 2D image data. The automatic controls include defining thresholds by which editing system 100 automatically detects positional and/or visual commonality (e.g., common or matching features) in two or more images, and uses the automatically detected commonality to align the images and create a 3D model or 3D image from the aligned images.

The 2D/3D data manipulation nodes include a mapping node. The mapping node maps color values and/or other visual data from 2D images of a scene to a 3D scan (e.g., a point cloud) of that scene. One or more settings of the mapping node provide manual or automatic controls for performing feature matching between the 2D images and the 3D scans. For instance, the manual control opens a visualization of a 2D image and a 3D scan, and a user selects points or regions in each visualization that correspond to the same feature in the 2D image and the 3D scan. The mapping node then transfers color values and/or other visual data from the 2D images to corresponding or aligned points in the 3D scan, thereby producing a 3D model or image that accurately represents the positions of the scene using the 3D scan data and coloring within the scene using the 2D image data. In some embodiments, the mapping node may also be used to map color values and/or other visual data from one 3D representation to another. For instance, the mapping node may be configured to transfer color values from a 3D mesh or polygonal model of an object or scene to a point cloud representation of the same object or scene. Similarly, the mapping node may map the color values and/or other descriptive characteristics from the point cloud data points onto to data points of another point cloud or onto the meshes, polygons, or other different primitives of a non-point cloud representation of the same scene or object.

The 2D/3D data manipulation nodes include a registration node. The registration node aligns different 3D scans of the same object or scene and generates a composite 3D model or representation of the object or scene based on the common data and the different data contained in each 3D scan. For instance, two 3D scans may both capture the front face of an object. However, the first of the two 3D scans may also capture the right face of the object but not the left face of the object, while the second of the two 3D scans may also capture the left face of the object but not the right face of the object. The registration node aligns the front face in each of the first and second scans, and generates a composite point cloud based on the common front face data, the right face data from the first scan, and the left face data from the second scan. One or more settings of the registration node include thresholds for detecting the common points or features and/or the degree or accuracy of alignment, and for specifying which values from two or more aligned scans to enter into the composite 3D model or point cloud. For instance, a first aligned scan may be of a lower resolution than a second aligned scan, so the registration node may be configured to generate the composite 3D model using data from the second scan over data of the first scan when the data from the two scans are overlapping or represent the same position in space. The one or more settings also include fields for specifying patterns or fiducials to assist in the alignment of the different scans.

In some embodiments, the structure-for-motion node, the mapping node, and the registration node are examples of 2D/3D data manipulations that are implemented by different tools or applications. Based on the node that is included as part of the workflow and the image data format or type that is passed to the node, editing system 100 automatically accesses and invokes the functions of the correct tool or application.

The 2D/3D data manipulation nodes include a panorama creation node. The panorama creation node generates a single 2D image from offset 2D datasets or image captures of the same scene or environment.

The 2D/3D data manipulation nodes include a density node. The density node includes settings for decimating or reducing the 2D/3D data that is input to the density node by removing 2D/3D data or combining 2D/3D data to lower the density or amount of distinct 2D/3D data. For instance, setting the density node for a 50% reduction in resolution or 2D/3D data may cause the density node to combine two neighboring pixels of a 2D image into a single pixel or two neighboring data points of a point cloud into a single data point. The density node also includes settings for increasing the resolution or density of 2D/3D data by filling in or adding 2D/3D data via interpolation or artificial intelligence and/or machine learning ("AI/ML") techniques. In some embodiments, the settings for the density node adjust the density of point cloud data points or other 2D/3D data by specifying a desired distance between data points or 2D/3D data, a randomized filling-in or decimation, or based on changes in surface normals across the surface of an object and/or the points that represent that surface.

The 2D/3D data manipulation nodes include a blending node. The blending node selects between or combines conflicting or different values that are captured for the same positions or features in different 2D/3D dataset. The blending node may be used in conjunction with the registration node or when generating a composite image from two or more images or scans. For instance, the blending node may select a region of a first scan that contains a higher density of data points or 2D/3D data than the same region in an aligned second scan. The one or more settings of the blending node specify which attributes to use in determining how to blend 2D/3D data from two or more aligned images or scans. For instance, the blending node may select 2D/3D data from the aligned scan that is sharper, brighter, contains less highlights, contains a higher density of 2D/3D data, excludes reflections, is of a higher resolution, and/or is differentiable based on other attributes. Similarly, the settings may specify a manner with which to combine or blend 2D/3D data from two or more aligned images or scans. The blending may be weighted or biased to favor the 2D/3D data of one image over another.

The 2D/3D data manipulation nodes include a transformation node. The transformation node specifies one or more of a translate, scale, rotate, skew, or other positional change to apply to 2D/3D data. The one or more settings of the transformation node control the amount, direction, and/or other values with which the 2D/3D data is translated, scaled, rotated, or skewed in a corresponding 2D space or 3D space.

The 2D/3D data manipulation nodes include a selection node. The selection node selects, cuts, or otherwise partitions the 2D/3D data that is passed to and processed by the other 2D/3D data manipulation nodes. For instance, rather than apply a color correction configured for the color correction node to the entirety of a 2D/3D dataset (e.g., a 2D image or a 3D point cloud), the selection node may be defined before the color correction node to select a specific subset of the 2D/3D dataset and to pass the specific subset of the 2D/3D data to the color correction node for color adjustment. The one or more configurable settings of the selection node provide different options for selecting 2D/3D data within different 2D/3D image formats. For instance, the one or more configurable settings may include fields for entering coordinates of a desired region, color values for pixels, polygons, data points, and/or other 2D/3D data to be selected, and/or other characteristics associated with the 2D/3D data that may be used to customize the selection to a desired subset of 2D/3D data. In some embodiments, the selection node may be configured with a manual selection. A user may use a lasso tool or other graphical tool to select a region of an image or an empty canvas, and editing system 100 selects the same region when processing the selection node based on the 2D/3D data that is passed to the selection node during workflow execution. In some other embodiments, editing system 100 may pause execution of the workflow upon reaching the selection node, and may provide a UI with which the user selects a desired region of the processed 2D/3D data passing to the selection node before resuming execution of the workflow based on the user selection. The one or more settings of the selection node may also specify the number of subsequent nodes in the workflow that the selection is to apply to before the selected 2D/3D data that is processed by the specified number of subsequent nodes is merged back into the overall 2D/3D dataset.

In some embodiments, UI 101 and editing system 100 include more or less nodes that implement different 2D/3D data manipulation operations than those described above. In any case, each node may invoke different functions of differently underlying 2D/3D data manipulation tools, APIs, applications, and/or other systems depending on the formatting or type of 2D/3D data that is passed to that node.

Figure 2:
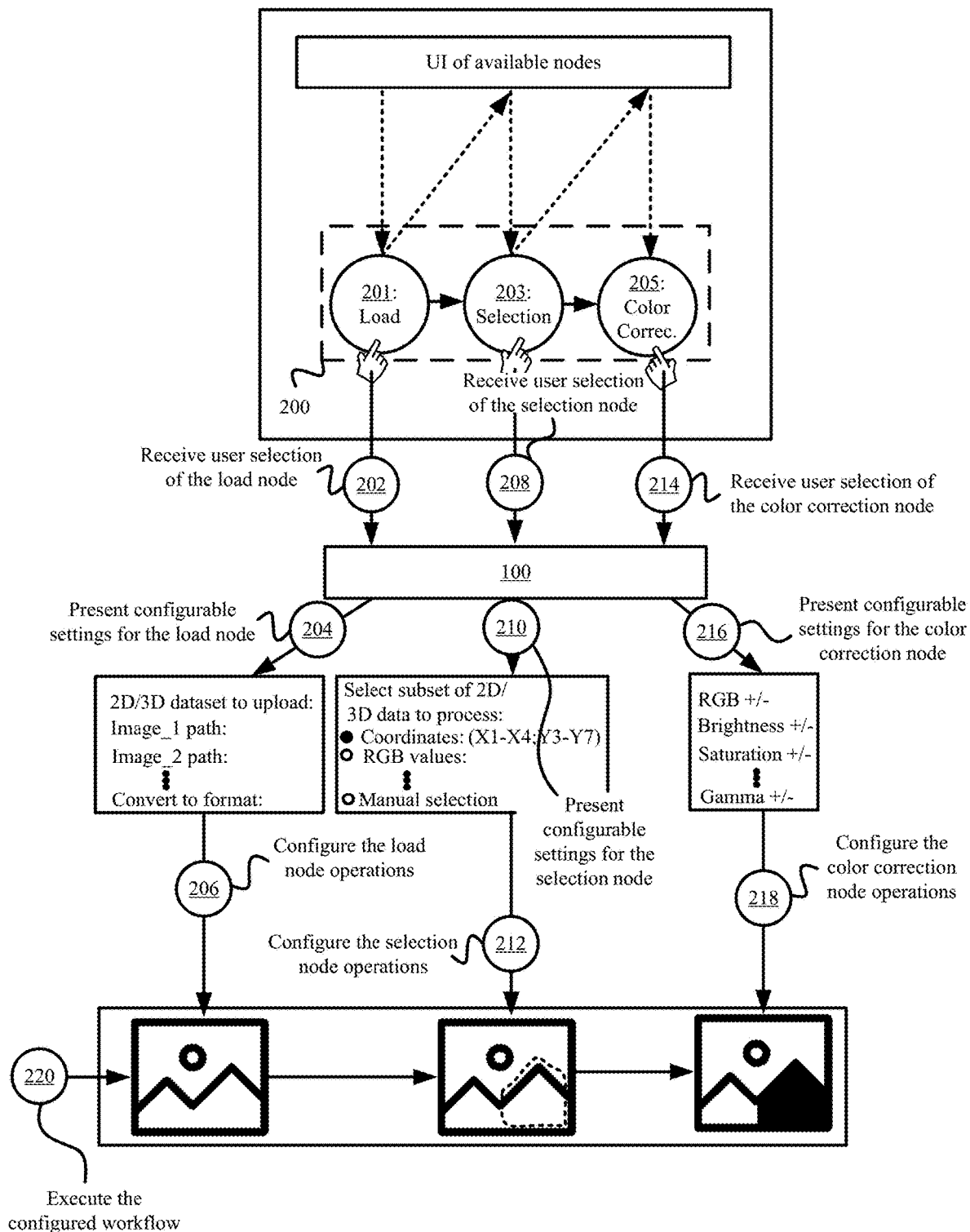
FIG. 2 illustrates an example of configuring nodes of a workflow in accordance with some embodiments presented herein.

FIG. 2 illustrates an example of configuring nodes 201, 203, and 205 of workflow 200 in accordance with some embodiments presented herein. As shown in FIG. 2, a user selects and links together load node 201, selection node 203, and color correction node 205 in sequence to define workflow 200. Specifically, the user drags-and-drops nodes 201, 203, and 205 from the available UI nodes into a workflow definition. The ordering by which nodes 201, 203, and 205 are placed in workflow 200 specifies the execution order for the 2D/3D data manipulation operations associated with nodes 201, 203, and 205. The user may change the linkages between nodes 201, 203, and 205 directly or indirectly by changing the ordering of nodes 201, 203, and 205 or how nodes 201, 203, and 205 connect to one another.

The user clicks (at 202) on the graphical representation of load node 201 to access and configure the load node settings. In response to the selection of load node 201, editing system 100 presents (at 204) the user with a first set of settings. Editing system 100 configures (at 206) the operations associated with load node 201 based on the configuration of the first set of settings. In some embodiments, configuring (at 206) load node 201 includes designating the path, URL, or location from which to access the 2D/3D data, and the format with which to load in the 2D/3D data into workflow 200. Load node 201 may convert the specified 2D/3D data from an original format to another format.

The user clicks (at 208) on the graphical representation of selection node 203 to configure the selection node settings. In response to the selection of selection node 203, editing system 100 presents (at 210) the user with a second set of settings. Editing system 100 configures (at 212) the operations associated with selection node 203 based on the configuration of the second set of settings. Configuring (at 212) selection node 203 involves selecting a subset of the 2D/3D data to pass to the subsequent nodes in workflow 200 (e.g., color correction node 205) for processing.

The user clicks (at 214) on the graphical representation of color correction node 205 to configure the color correction node settings. In response to the selection of color correction node 205, editing system 100 presents (at 216) the user with a third set of settings. Editing system 100 configures (at 218) the operations associated with color correction node 205 based on the configuration of the third set of settings. The third set of settings control the adjustments that color correction node 205 makes to the color values of the subset of the 2D/3D data selected based on the configuration of selection node 203.

Editing system 100 executes (at 220) workflow 200 in response to user input. Executing (at 220) the workflow includes editing system 100 loading 2D/3D data via the access paths, locations, URLs, and/or other identifiers configured as part of load node 201, converting the 2D/3D data to one or more different formats based on the configuration of load node 201, selecting a subset of the loaded 2D/3D data based on the selection criteria configured as part of selection node 203, and manipulating the color values of the subset of 2D/3D data based on the settings configured for color correction node 205.

In some embodiments, editing system 100 adapts the UI and the available set of nodes to include nodes that are compatible with other nodes the user has selected and/or configured for the workflow and/or to include nodes that are compatible with the 2D/3D data being output from a preceding node in the workflow. By enabling and disabling nodes that may be entered at different parts of a user-defined workflow, editing system 100 automatically filters the 2D/3D data manipulation functions that may be applied to the 2D/3D data so that the user is prevented from configuring 2D/3D data manipulation operations that cannot be applied to the 2D/3D data passing through the workflow.

Figure 3:
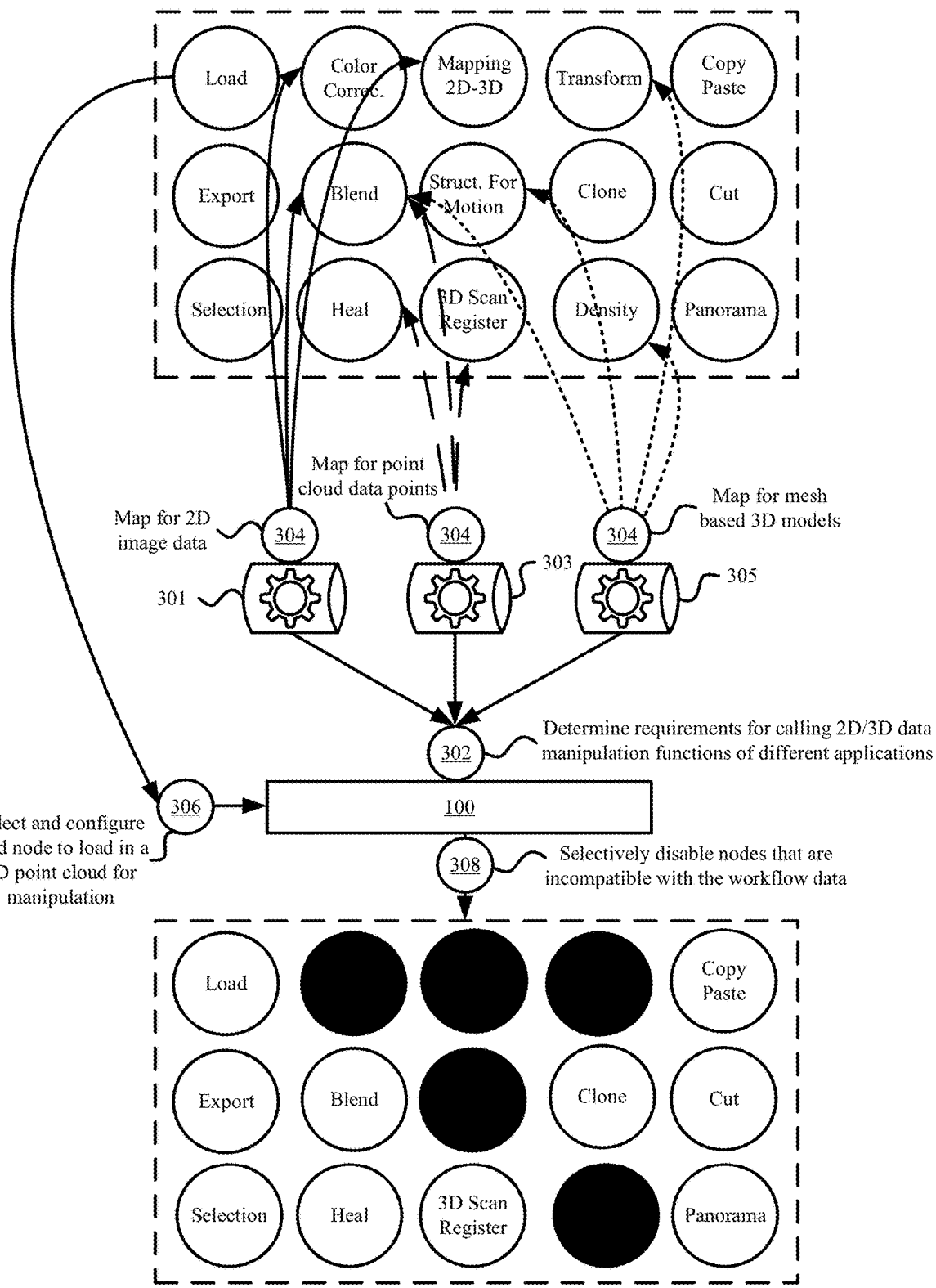
FIG. 3 illustrates an example of automatically adapting a user interface in response to the definition of a workflow in accordance with some embodiments presented herein.

FIG. 3 illustrates an example of editing system 100 automatically adapting the UI in response to the definition of a workflow in accordance with some embodiments presented herein. Editing system 100 determines (at 302) the input parameters and/or requirements for executing different 2D/3D data manipulation functions of different 2D/3D data editing applications 301, 303, and 305 that editing system 100 uses to execute the different workflows. For instance, editing system 100 determines (at 302) that first application 301 provides 2D image manipulation functions and requires 2D image data as input, second application 303 contains functions for editing 3D polygon models and requires 3D polygon image data as input, and third application 305 provides 3D point cloud image manipulation functions as requires point cloud data points as input. In some embodiments, editing system determines (at 302) the input parameters and/or requirements of different applications 301, 303, and 305 by querying, scanning, or calling the functions of each application 301, 303, 305 using different example sets of 2D/3D data. In some embodiments, editing system is configured with the functions of each application 301, 303, and 305 and the 2D/3D data formats or types supported by each function.

Editing system 100 maps (at 304) the functions from each application 301, 303, and 305 to the nodes of the UI that add the corresponding 2D/3D data manipulations associated with each of the functions to a workflow. The mapping (at 304) includes associating one or more rules for each function that is mapped to a particular node. The rules associated with a particular node control when the functions of one application are called instead of functions of another application based on the state of the 2D/3D data passing to a particular node.

Editing system 100 dynamically enables and disables different nodes during the definition of a workflow based on the rules associated with each node and the format or type of 2D/3D data passing to that node. For instance, a user selects and configures (at 306) a load node to load in a point cloud file for processing. In response to the configuration (at 306) of the load node and loading in of the point cloud file, editing system 100 disables (at 308) any 2D/3D data manipulation nodes that are incompatible with or that do not contain functions that execute on the data points (e.g., the specifically formatted image data) of the point cloud file.

As shown in FIG. 3, editing system 100 disables (at 308) the mapping node and the structure for motion nodes because the mapping node functionality and the structure for motion functionality requires two sets of 2D/3D data to function and/or are not applicable to point clouds without also loading in 2D image data. Additionally, editing system 100 disables (at 308) the color correction node, the transform node, and the density node because applications 301 and 303 implement the associated 2D/3D data manipulation operations on 2D image data or mesh based 3D models and are therefore incompatible with point cloud image data that is loaded with the load node. Disabling (at 308) the nodes involves removing the nodes from the UI or preventing the user from adding the nodes and the associated 2D/3D data manipulation operations as part of the workflow.

In defining a second workflow that loads in 2D image data, editing system 100 may adjust the set of nodes that are enabled and that may be included as part of the second workflow from other nodes with 2D/3D data manipulation functions that are incompatible with the 2D image data and may not be included as part of the second workflow. However, as the user defines the second workflow and converts the 2D data to 3D data via a mapping node or other 2D/3D data manipulation nodes, editing system 100 may modify the available set of nodes to enable the 2D/3D data manipulation nodes that apply to the 3D data based on the changing state of the data in the second workflow. In other words, editing system 100 may track the 2D/3D data state, and may continually enable and disable different nodes from the UI based on the tracked 2D/3D data state.

Similarly, some nodes may be unavailable or disabled until one or more other nodes are added to the workflow. For instance, one or more functions of the 2D/3D data manipulation applications may not be performed on the entire 2D/3D dataset. Accordingly, the selection node may have to be selected and configured for a workflow in order to enable the one or more functions of the 2D/3D data manipulation applications that may not be performed on the entire 2D/3D dataset.

Editing system 100 further simplifies the workflow generation by providing the user with 2D/3D data manipulation nodes that are agnostic of the two or more functions, tools, APIs, or applications that perform the same or similar 2D/3D data manipulation operation on different types of 2D/3D data. Editing system 100 performs the mapping of the workflow nodes to the correct 2D/3D data manipulation function of different applications or APIs so that the user is able to define the desired operations without concern of which application or API supports the desired operations.

Figure 4:
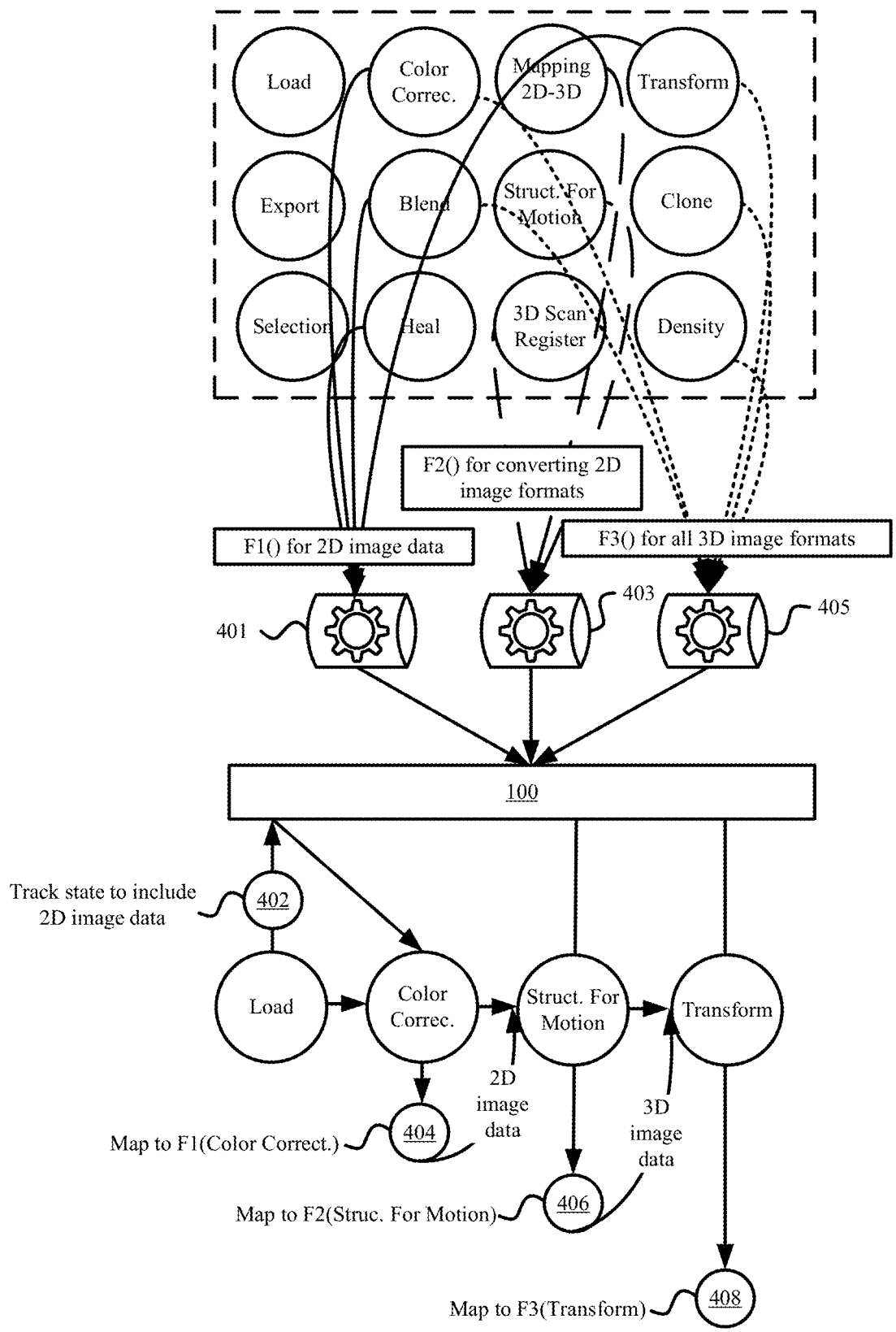
FIG. 4 illustrates an example of the mapping between workflow nodes to different application functions occurring during execution of a workflow in accordance with some embodiments presented herein.

FIG. 4 illustrates an example of the mapping between workflow nodes to different application functions occurring during execution of a workflow in accordance with some embodiments presented herein. FIG. 4 illustrates editing system 100 having access to first application 401, second application 403, and third application 405, and the different sets of 2D/3D data manipulation functions and/or operations implemented by each application 401, 403, and 405. In some embodiments, first application 401, second application 403, and third application 405 represent different APIs, tools, and/or other systems that provide and implement different 2D/3D data manipulation operations used by editing system 100 to execute different workflows.

Editing system 100 receives or monitors the definition of a workflow. As each node is added and configured as part of the workflow, editing system 100 selects a 2D/3D data manipulation operation and/or function from one of first application 401, second application 403, and third application 405 that implements the 2D/3D data manipulations associated with the configured node, and that is compatible with the 2D/3D data being provided as input to the configured node from the output of a preceding node in the workflow or that is loaded into the workflow by a node immediately before the configured node.

For instance, editing system 100 tracks (at 402) the 2D/3D data state resulting from a first node of the workflow, and determines that the 2D/3D data loaded in or produced by the first node is in 2D format. Editing system 100 determines that a second node of the workflow performs a color correction on the last tracked 2D/3D data state, determines that first application 401 includes a first function for color correcting point cloud data points, and maps (at 404) the second node to the first function of first application 401. Mapping (at 404) the second node to the first function includes defining a function call that calls the first function of first application 401 upon executing the second node, that provides the 2D image data or pixels from the first node as input to the second node for execution by the first function, and that configures the first function based on settings specified for the second node.

Editing system 100 determines that a third node of the workflow involves creating a 3D model from the color corrected pixels of the 2D image data resulting from executing the second node. Editing system 100 determines that first application 401 does not have a function for converting pixels of a 2D image to a 3D model, but that second application 403 includes such a function. Accordingly, editing system 100 maps (at 406) the second node to a second function of second application 403 so that the second function is called to create the 3D model from the color corrected 2D image data when executing the second node of the workflow. Specifically, editing system 100 provides the output generated by the first function of first application 401 as input for the second function of second application 403.

Editing system 100 determines that a fourth node of the workflow definition involves transforming the created 3D model. Editing system 100 determines that first application 401 and third application 405 includes transformation operations, but that only third application 405 supports transformation of 3D data. Accordingly, editing system 100 maps (at

408) the fourth node to a third function of third application 405 to perform the 3D transformation of the 3D data that is output by the third node.

By combining and exposing the correct functionality from different applications based on the changing 2D/3D data state throughout the workflow, editing system 100 allows for the definition of complex workflows that involve various 2D and 3D formats without the user having to manually switch between different tools, APIs, applications, or systems that support a subset of the 2D/3D formats, and without the user having to be limited by the individual limitations of each tool, API, application, or system.

Each workflow provides a repeatable sequence of 2D/3D data manipulation operations. Users may use the workflows to apply the same 2D/3D data manipulation operations to produce a common look between 2D/3D data captured with a particular imaging device or 2D/3D data of a common scene or environment. If the workflow produces an undesirable result, the user may edit one or more nodes of the workflow to modify the workflow and produce the desired result without having to redefine the entire workflow.

To simplify the editing and isolating of nodes that produce the undesired results, editing system 100 stores the 2D/3D data state after processing by each node so that the user is able to visualize the changes that result from executing each node. Moreover, editing system 100 may use the stored 2D/3D data state to accelerate image processing when one or more nodes are changed. In some embodiments, when a particular node of the workflow is changed and a user selects to process the same 2D/3D data using the workflow with the changes to the particular node, editing system 100 may start execution of the workflow using the previously generated 2D/3D data state of the node immediately before the changed particular node rather than restarting execution from the first node of the workflow. In this manner, editing system 100 completes the workflow in less time, and presents the results of the changes that the user made to the particular node in less time than when having to execute the 2D/3D data manipulations operations of all workflow nodes.

Figure 5:
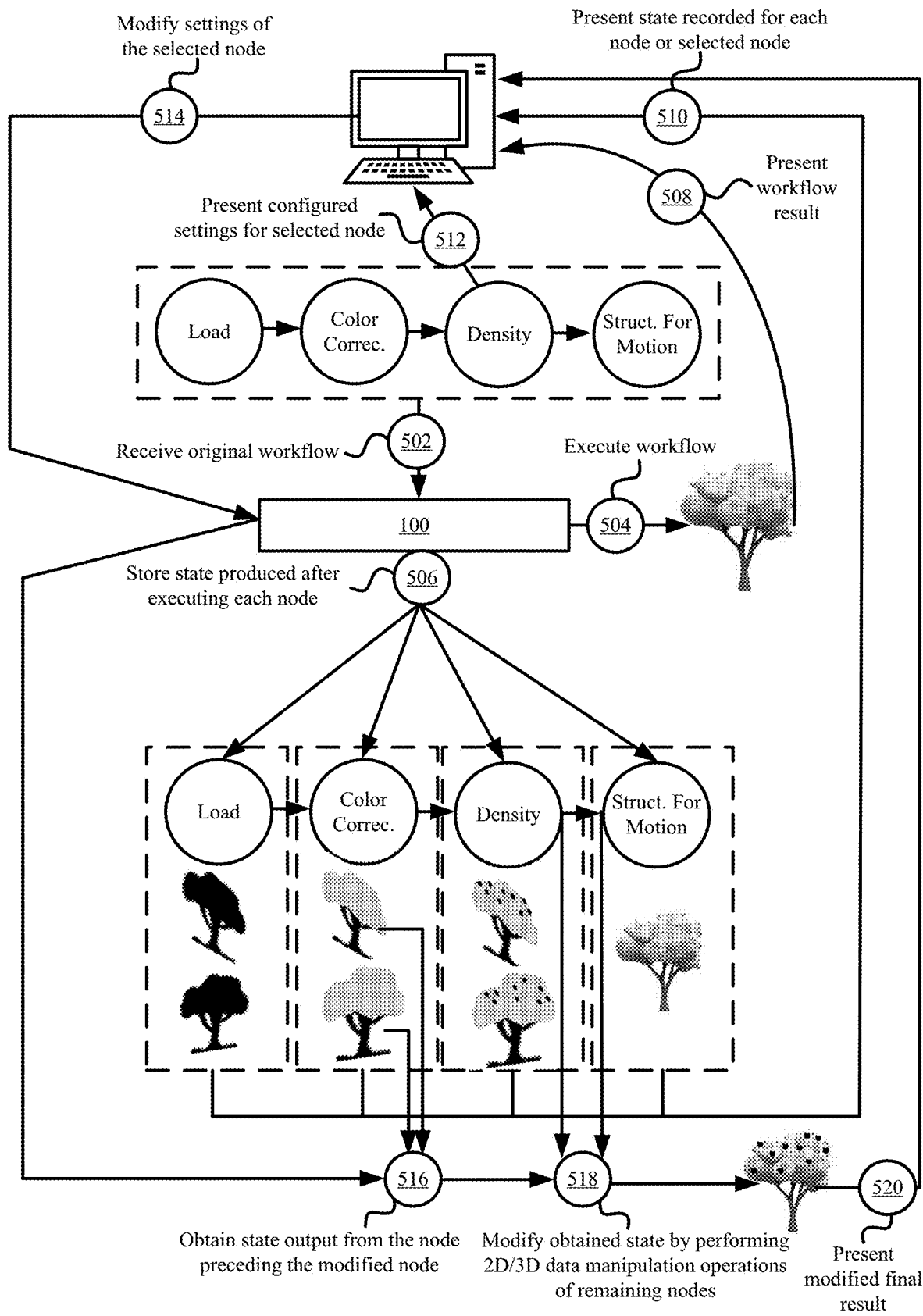
FIG. 5 illustrates an example of resuming workflow execution after editing one or more workflow nodes in accordance with some embodiments presented herein.

FIG. 5 illustrates an example of resuming workflow execution after editing one or more workflow nodes in accordance with some embodiments presented herein. Editing system 100 receives (at 502) an original workflow with a first set of nodes.

Editing system 100 executes (at 504) the original workflow by performing the 2D/3D data manipulation and/or other operations associated each node of the first set of nodes. Editing system 100 stores (at 506) the 2D/3D data state that is produced after executing the 2D/3D data manipulation and/or other operations associated with each node. Editing system 100 stores (at 506) the 2D/3D data state that results after executing each node with that node. Accordingly, the workflow nodes store (at 506) a different snapshot of the 2D/3D data undergoing manipulation and/or processing in order to record the changes that occurred to the 2D/3D data after each node of the workflow.

Editing system 100 presents (at 508) the final visualization that results from executing the original workflow. If the user is not satisfied with the final visualization, the user is able to go back and view the individual snapshots to determine the specific node where the associated 2D/3D data manipulation operations produced undesired results. Accordingly, editing system 100 presents (at 510) the snapshot recorded after executing one or more nodes selected by the user. In some embodiments, the user may view the snapshots in reverse order starting with the snapshot of the image before the last 2D/3D data manipulation operation was applied and continuing to go backward to show snapshots of the 2D/3D data before other manipulation operations were applied. In some other embodiments, the user selects any node in the workflow to see the 2D/3D data snapshot or 2D/3D data state associated with that node, and may move forward or backward in the workflow to view additional 2D/3D data snapshots or 2D/3D data states.

Editing system 100 receives a selection of a particular node that the user wishes to modify. Editing system 100 presents (at 512) the one or more configurable settings that are defined for the particular node.

Editing system 100 modifies (at 514) the one or more configurable settings in response to user input. Modifying (at 514) the one or more configurable settings includes changing the associated 2D/3D data manipulation operations and/or how they are applied to the prior state of 2D/3D data provided by the preceding node in the workflow (e.g., the node that is immediately before the particular node in the workflow). In some embodiments, modifying (at 514) the one or more configurable settings includes removing the particular node from the workflow or replacing the particular node with another node that applies different 2D/3D data manipulation operations to the prior state of 2D/3D data provided by the preceding node in the workflow.

Editing system 100 executes the modified workflow after the changes to the particular node are completed. Executing the modified window includes resuming execution of the workflow at the particular node using the 2D/3D data state that is created by the preceding node that is immediately before the particular node in the workflow. Specifically, rather than execute by loading in the original 2D/3D data and beginning execution from the first node of the workflow, editing system 100 obtains (at 516) the prior state of 2D/3D data that is stored with the preceding node, and modifies (at 518) the prior state of 2D/3D data with the modified 2D/3D data manipulation operations of the particular node (e.g., the modified node) and the 2D/3D data manipulation operations of all other nodes that are after the particular node. Consequently, editing system 100 generates and presents (at 520) the modified final visualization in less time than when having to execute each and every node of the workflow anew. Additionally, editing system may update the modified state of the 2D/3D data that is stored for any node that is executed during the second pass through the workflow.

Depending on the length of the workflow, complexity of the 2D/3D data manipulation operations, and/or the amount of 2D/3D data that is to be processed, execution of the entire workflow may take minutes or hours to complete. In some embodiments, editing system 100 uses AI/ML techniques to analyze the results produced by each workflow node to automatically detect anomalous or undesired state changes. In some such embodiments, editing system 100 presents the AI/ML detected anomalous or undesired state changes to the user before the entire workflow execution completes. Editing system 100 may interrupt the workflow execution at a particular node that produces anomalous or undesired state changes, and may present the anomalous or desired state changes produced by the particular node to the user so that the user does not have to wait until completion of the workflow to make corrections. In some other embodiments, editing system 100 presents the AI/ML detected anomalous or undesired state changes with the final result so that the user is able to more quickly isolate the nodes that generated the anomalous or undesired state changes.

Figure 6:
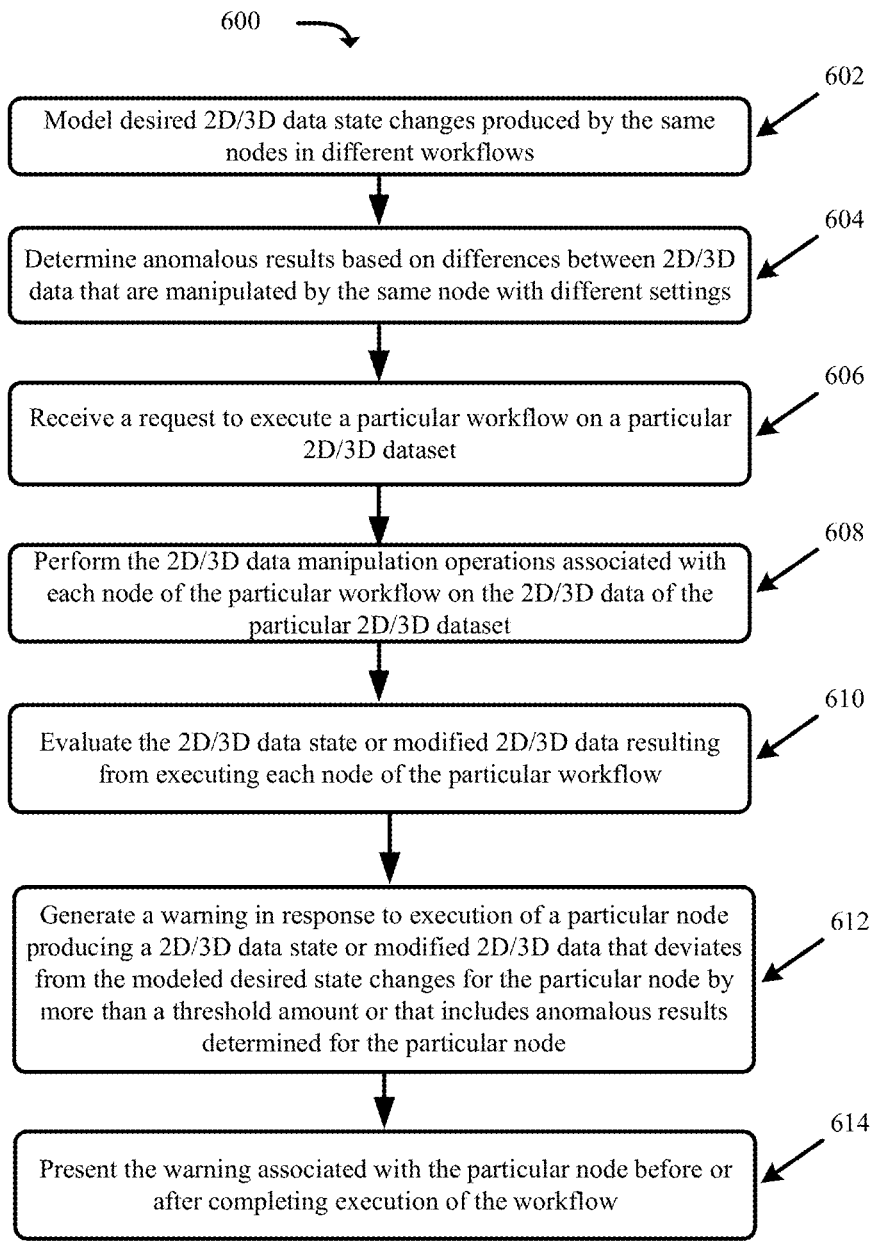
FIG. 6 presents a process for artificial intelligence and/or machine learning analysis of different image states generated by nodes of an executing workflow in accordance with some embodiments presented herein.

FIG. 6 presents a process 600 for AI/ML analysis of different 2D/3D data states generated by nodes of an executing workflow in accordance with some embodiments presented herein. Process 600 is implemented by editing system 100 using one or more AI/ML techniques for recognizing different anomalous or undesired state changes.

Process 600 includes modeling (at 602) desired 2D/3D data state changes produced by the same nodes in different workflows. The modeling (at 602) includes performing 2D/3D data analysis, comparative analysis, pattern recognition, and/or other comparisons to determine commonality in the state changes produced by the same node in different workflows. The modeling (at 602) may be constrained to workflows of a particular user. Each user may have their preferences as to the usage and/or configuration of different 2D/3D data manipulation operations and/or nodes. For instance, the particular user may consistently apply the blending node or the color correction node to the 2D/3D data that is captured or uploaded by the particular user to editing system 100. Alternatively, the AI/ML techniques may determine commonality in the 2D/3D data after applying the blending node or the color correction node to different 2D/3D data of the particular user. The commonality may include identifying a preferred brightness, highlights over lowlights, underexposing regions with red coloring and overexposing regions with green coloring, and/or other quantifiable similarity in the 2D/3D data after the 2D/3D data manipulation operations of the same node are applied to different 2D/3D data of the same user.

Process 600 includes determining (at 604) anomalous results based on differences between 2D/3D data that is manipulated by the same node with different settings. Specifically, editing system 100 may determine that first 2D/3D data resulting from applying the 2D/3D data manipulation operations of a particular node with a first set of settings contains anomalous results when the user rejects that first 2D/3D data and reapplies the particular node with a second set of settings. Editing system 100 identifies the anomalous results based on the differences between the first 2D/3D data and second 2D/3D data that results from applying the 2D/3D data manipulation operations of the particular node with the second set of settings. In other words, editing system 100 records the differences that were present in the first 2D/3D data but absent in the second 2D/3D data as anomalous results produced by the particular node.

Process 600 includes receiving (at 606) a request to execute a particular workflow on a particular 2D/3D dataset. Process 600 includes performing (at 608) the 2D/3D data manipulation operations associated with each node of the particular workflow on the 2D/3D data of the particular 2D/3D dataset.

Process 600 includes evaluating (at 610) the 2D/3D data state or modified 2D/3D data resulting from executing each node of the particular workflow. Evaluating (at 610) the 2D/3D data states includes comparing the 2D/3D data state or modified 2D/3D data that results from performing the 2D/3D data manipulation operations of each node against the modeled (at 602) desired state changes for that node and the anomalous results determined (at 604) for that node.

Process 600 includes generating (at 612) a warning in response to execution of a particular node producing a 2D/3D data state or modified 2D/3D data that deviates from the modeled (at 602) desired state changes for the particular node by more than a threshold amount or that includes anomalous results determined (at 604) for the particular node. The warning includes a snapshot of the 2D/3D data state or modified 2D/3D data and/or an identification of the anomalous results within the snapshot.

Process 600 includes presenting (at 614) the warning associated with the particular node before or after completing execution of the workflow. In some embodiments, presenting (at 614) the warning includes halting the workflow execution at the particular node and presenting the snapshot of the 2D/3D data generated by the particular node with an identification of the anomalous results to the user. In some other embodiments, presenting (at 614) the warning includes executing the 2D/3D data manipulation operations associated with each node of the workflow, recording, with each node, the state changes or 2D/3D data changes that are generated after execution of each node, and presenting the final result produced from the workflow with the warning that is generated for the particular node.

Editing system 100 provides additional means with which the user can spot anomalous results at different nodes of the workflow before execution of the workflow is complete. In some embodiments, editing system 100 generates a low resolution preview of the 2D/3D data after being manipulated by each workflow node while also generating the output of each workflow node at a full resolution. The low resolution preview allows the user to preview the results produced by each node without having to wait for the lengthier full resolution execution to complete. Accordingly, if the user detects an error or undesired result in the low resolution preview that is generated for a particular node, the user may halt the full resolution execution, edit the particular node and restart the workflow execution.

Figure 7:
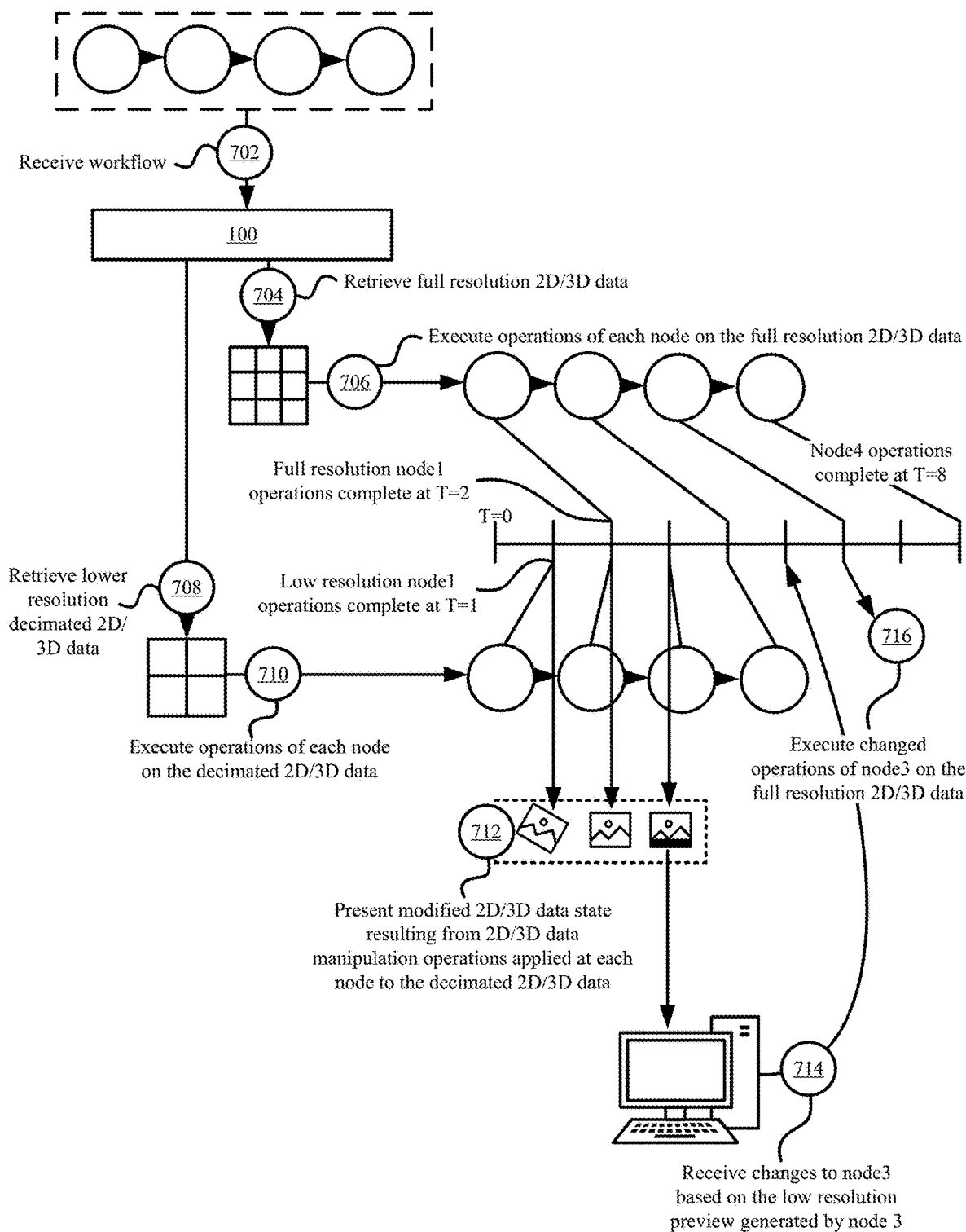
FIG. 7 illustrates an example of simultaneous low resolution and full resolution workflow execution in accordance with some embodiments presented herein.

FIG. 7 illustrates an example of simultaneous low resolution and full resolution workflow execution in accordance with some embodiments presented herein. Editing system 100 receives (at 702) a workflow that is defined with a set of nodes.

Editing systems 100 initiates the full resolution execution of the workflow by retrieving (at 704) the full resolution 2D/3D data that is specified in one or more nodes of the workflow, and by performing (at 706) the 2D/3D data manipulation operations associated with each node of the workflow on the full resolution 2D/3D data. Editing system 100 also initiates the low resolution execution of the workflow by retrieving (at 708) a decimated subset of the 2D/3D data, and by performing (at 710) the 2D/3D data manipulation operations associated with each node of the workflow on the decimated subset of the 2D/3D data that is less than all of the full resolution 2D/3D data. For instance, editing system 100 may decimate the retrieved 2D/3D data to retain half of the 2D/3D data. The decimation may include retaining every other pixel, polygon, or data point of the retrieved 2D/3D data. In some embodiments, editing system 100 may reencode the 2D/3D data from the full resolution to a lower second resolution, and may perform the low resolution execution of the workflow using the 2D/3D data at the second resolution.

In some embodiments, editing system 100 initiates the full resolution and the low resolution execution of the workflow at the same time or in parallel threads or processes. The low resolution execution advances through the nodes more quickly than the full resolution execution due to each node of the low resolution execution having less 2D/3D data to process than each node of the full resolution execution.

Editing system 100 presents (at 712) the modified 2D/3D data state and/or modified 2D/3D data that results as the 2D/3D data manipulation operations of each node from the low resolution execution are completed. In other words, editing system 100 provides a low resolution preview of the 2D/3D data state after each node of the workflow is executed. The low resolution previews that are presented (at 712) to a user provide 2D/3D data states from one or more nodes that are further along the workflow than those being processed as part of the full resolution execution. A user inspects the previews to determine whether to continue with the workflow execution or to halt the workflow execution in order to make changes to one or more nodes.

In response to the user detecting an issue in a preview generated by a particular node of the workflow, editing system 100 continues performing the 2D/3D data manipulation operations of the full resolution workflow execution until the full resolution workflow execution catches up with the low resolution workflow execution and reaches the particular node where the user requested a change. Meanwhile, editing system 100 receives (at 714) changes that the user makes to the particular node to correct the issue detected in the low resolution preview of the particular node.

Editing system 100 resumes (at 716) the full resolution and the low resolution execution of the workflow from the particular node with the changes applied to the particular node. Once again, the low resolution execution advances ahead of the full resolution execution so that the user may identify and correct issues based on the low resolution previews without having to wait for the slower full resolution execution to reach the same state or node in the workflow.

The workflows may be defined with branches that perform different 2D/3D data manipulation operations on different sets of the 2D/3D data, and may merge the branches back to consolidate the different manipulated 2D/3D data and to perform other 2D/3D data manipulation operations on the consolidated data. In some embodiments, editing system 100 dynamically allocates resources to promote the parallelism created in the branches and/or to accelerate the execution of the workflow.

Figure 8:
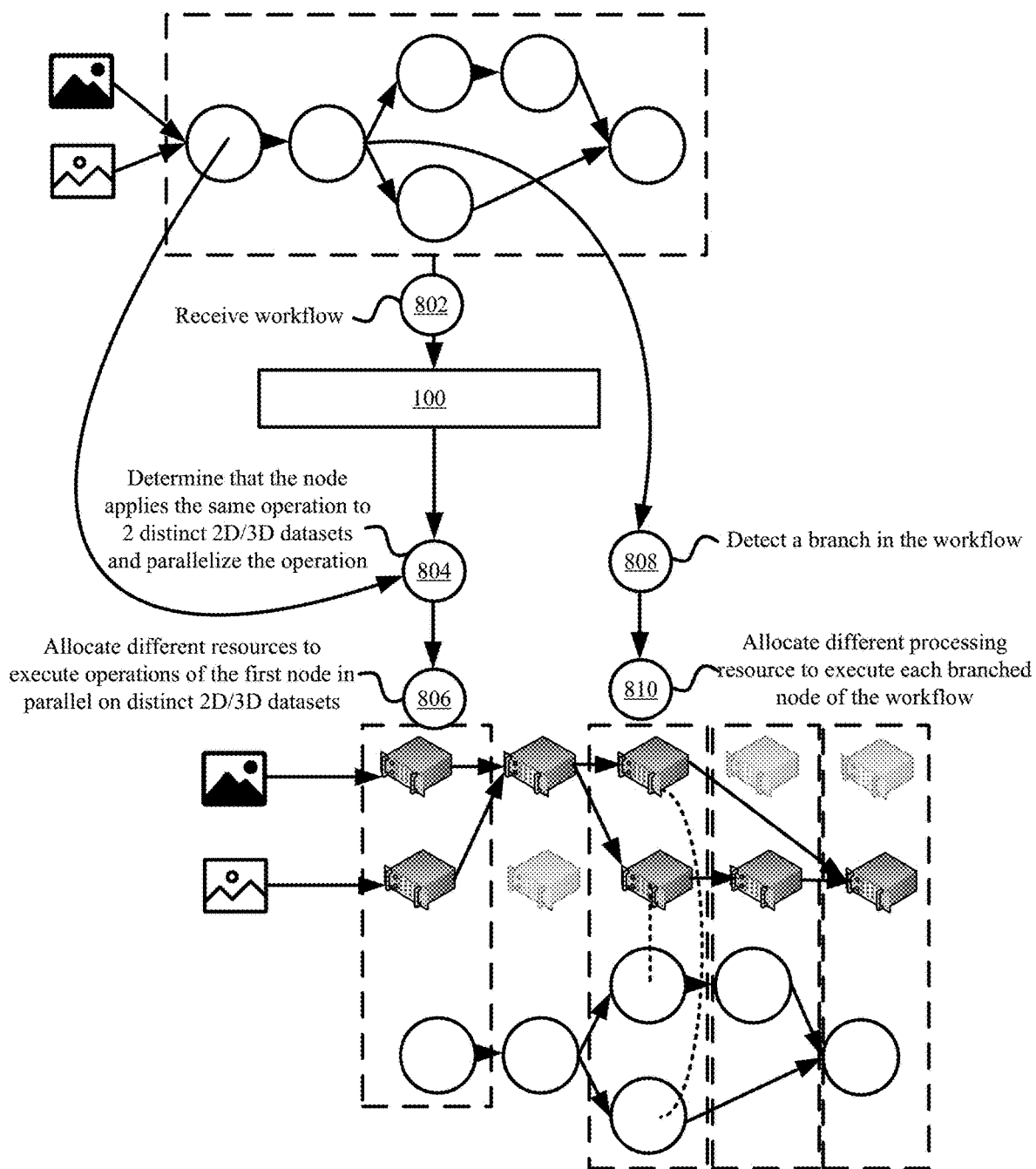
FIG. 8 illustrates an example of dynamically allocating resources for workflow execution in accordance with some embodiments.

FIG. 8 illustrates an example of dynamically allocating resources for workflow execution in accordance with some embodiments. Editing system 100 receives (at 802) a workflow for execution.

Editing system 100 analyzes the nodes and the formatting or type of 2D/3D data provided as input to each of the nodes of the workflow. From the analysis, editing system 100 identifies that a first node performs the same 2D/3D data manipulation operation on 2D/3D data of two distinct 2D/3D dataset. For instance, the first node may be defined and configured perform a rotation on a 2D image and a similar rotation on a 3D image.

Editing system 100 determines (at 804) that the 2D/3D data manipulations of the first node may be parallelized and are more efficiently executed by different processing resources. Accordingly, editing system 100 allocates (at 806) a first processing resource, that is optimized for 2D image processing, to perform the 2D/3D data manipulation operations of the first node on the 2D image, and a different second processing resource, that is optimized for 3D image processing, to perform the 2D/3D data manipulation operations of the first node on the 3D image. For instance, the first processing resource may be a central processing unit ("CPU") that efficiently performs the 2D rotations, and the second processing resource may be graphics processing unit ("GPU") that efficiently performs the 3D rotations by computing the dot product on multi-dimensional matrices. In some embodiments, the first and second processing resources may include different servers, devices, or sets of cloud resources that may be dynamically allocated (at 806) for the execution of the same or different operations.

Editing system 100 detects (at 808) a branch in the workflow in which a first branched node is defined with operations that apply to a first set of the 2D/3D data and a second branched node is defined with operations that apply to a second set of the 2D/3D data. Since the 2D/3D data manipulation operations of the first branched node and the second branched node apply to different 2D/3D data, editing system 100 is again able to take advantage of the parallelism and allocate (at 810) different processing resources to execute the first branched node and second branched node simultaneously or contemporaneously.

Additionally, editing system 100 may perform a parallel processing of the same workflow with different configured nodes to present a side-by-side comparison of the results produced as a result of configuring the same node with different settings. A user is able to select between the results or halt execution of one of the workflows that produces undesired results.

Figure 9:
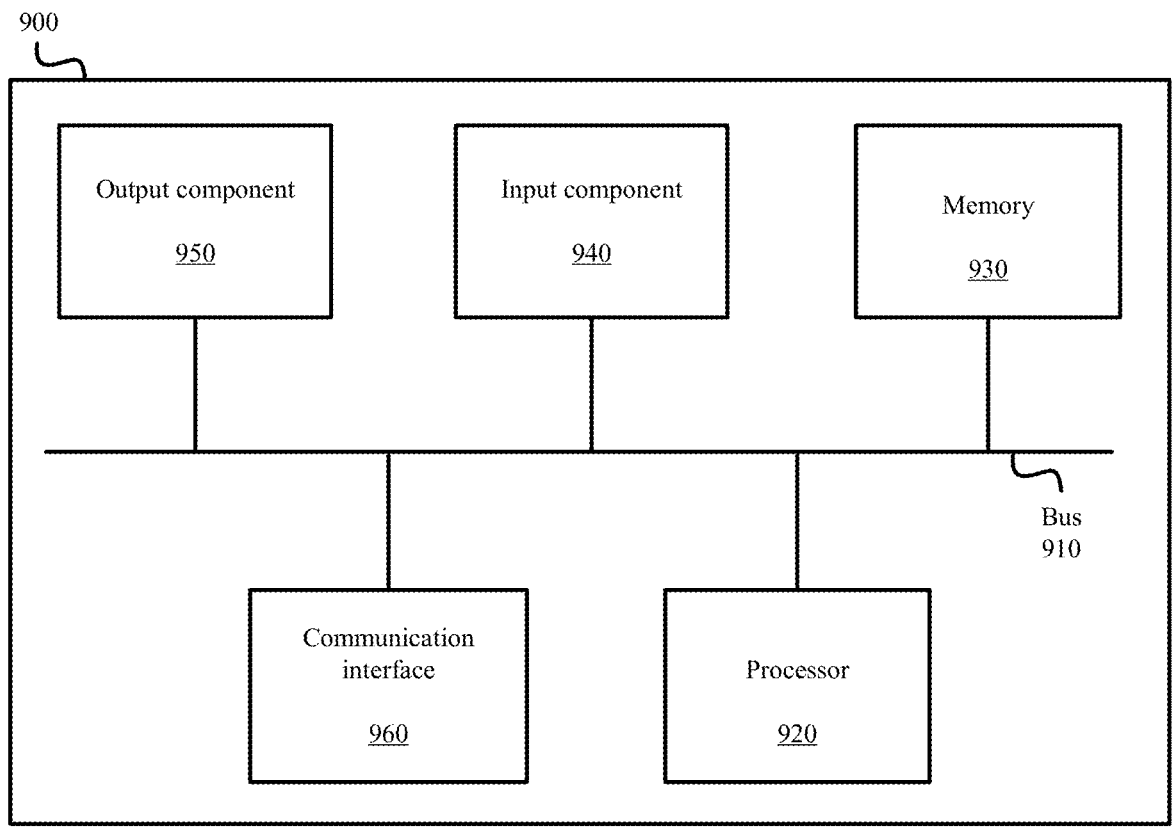
FIG. 9 illustrates example components of one or more devices, according to one or more embodiments described herein.

FIG. 9 is a diagram of example components of device 900. Device 900 may be used to implement one or more of the devices or systems described above (e.g., editing system 100, processing resources, user device, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, at an editing system, a workflow comprising a plurality of nodes, each node of the plurality of nodes being associated with one or more operations that perform a different manipulation of two-dimensional or three-dimensional ("2D/3D") data;
   accessing a plurality of applications with the editing system, each application of the plurality of applications comprising a function that implements the one or more operations of a node on the 2D/3D data in at least one of a plurality of different states;
   determining, by operation of one or more hardware processors of the editing system, that the one or more operations associated with a first node of the plurality of nodes are implemented by a first function of a first application from the plurality of applications when the 2D/3D data has a first state, and are implemented by a second function of a second application from the plurality of applications when the 2D/3D data has a second state;
   executing, by operation of the one or more hardware processors, the first node by invoking the first function of the first application over the second function of the second application that are both associated with the first node based on the 2D/3D data having the first state that maps to the first function of the first application and not the second function of the second application;
   determining, by operation of the one or more hardware processors, that the 2D/3D data is converted from a first format to a different second format that is associated with the second state of the 2D/3D data in response to the executing of the first node; and
   executing, by operation of the one or more hardware processors, a second node that is after the first node in the workflow by invoking a third function of the second application that implements the one or more operations associated with the second node based on the 2D/3D data in the different second format being associated with the second state that is compatible with functions of the second application and that is incompatible with functions of the first application.

2. The method of claim 1 further comprising:
   providing a user interface ("UI") comprising a visual representation for each node of the plurality of nodes;

dragging and dropping the visual representation for each node of the plurality of nodes in a particular order based on a user input provided via the UI; and defining the workflow in response to the particular order of the visual representation for each node of the plurality of nodes in the UI.

3. The method of claim 1 further comprising:

mapping the first node of the workflow to the first function of the first application based on the 2D/3D data of the first format being provided as the input to the first node and the functions of the first application applying to the 2D/3D data of the first format; and mapping the second node of the workflow to the third function of the second application based on the 2D/3D data of the second format being provided as input to the second node and the functions of the second application applying to the 2D/3D data of the second format.

4. The method of claim 1, wherein the 2D/3D data in the first format comprises pixels of a two-dimensional ("2D") image; and wherein the 2D/3D data in the second format comprises three-dimensional ("3D") data of a 3D image.

5. The method of claim 1 further comprising:

selecting the first node from the workflow in response to a user input provided with respect to the first node;

presenting a set of settings that change execution of the one or more operations associated with the first node; and configuring the first function of the first application based on values provided for the set of settings, wherein configuring the first function comprises defining a function call that executes the first function with parameters specified according to the set of settings.

6. The method of claim 1 further comprising:

presenting a UI comprising the plurality of nodes;

adding the first node to the workflow in response to a user input; and filtering the plurality of nodes that are presented in the UI by disabling a set of the plurality of nodes from the UI in response to the one or more operations associated with the first node converting the 2D/3D data in the first format to the second format and the set of the plurality of nodes comprising functions that are incompatible with the 2D/3D data in the second format.

7. The method of claim 1 further comprising:

allocating a first compute resource from a plurality of compute resources to the first node in response to the first compute resource being optimized for processing the 2D/3D data in the first format; and allocating a second compute resource from the plurality of compute resources to the second node in response to the second compute resource being optimized for processing the 2D/3D data in the second format, wherein the first compute resource executes the one or more operations associated with the first node in less time than the second compute resource, and wherein the second compute resource executes the one or more operations associated with the second node in less time than the first compute resource.

8. The method of claim 1, wherein executing the first node comprises:

performing the one or more operations associated with the first node on the 2D/3D data in the first format at a full resolution over a first time;

performing the one or more operations associated with the first node on the 2D/3D data in the first format at a lower resolution over a second time, wherein the lower resolution is less than the full resolution, and wherein the second time spans a first part of the first time and is less than the first time; and presenting a preview of output that is generated by the first node at an end of the second time based on results from the performing of the one or more operations on the 2D/3D data at the lower resolution while continuing the performing of the one or more operations on the 2D/3D data at the full resolution.

9. The method of claim 8 further comprising:

modifying settings of the second node after the presenting of the preview; and wherein executing the second node comprises changing execution of the third function of the second application in response to the modifying of the settings of the second node.

10. The method of claim 1 further comprising:

storing the 2D/3D data modified from the first state to the second state with the first node after the executing of the first node, wherein the 2D/3D data modified from the first state to the second state corresponds to the 2D/3D data in the second format that is output as a result of applying the one or more operations associated with the first node to the 2D/3D data; and storing the 2D/3D data modified from the second state to a third state with the second node after the executing of the second node, wherein the 2D/3D data modified from the second state to the third state corresponds to the 2D/3D data in a third format that is output as a result of applying the one or more operations associated with the second node to the 2D/3D data.

11. The method of claim 10 further comprising:

presenting a 2D/3D data state that is stored with each node of the plurality of nodes;

modifying one or more settings of the second node in response to the 2D/3D data having the third state comprising an undesired result; and resuming execution of the workflow at the second node using the second state of the 2D/3D data that is stored with the first node without starting execution of the workflow from the first node.

12. The method of claim 10 further comprising:

modeling commonality in 2D/3D data states output by the second node in a plurality of workflows;

comparing the third state of the 2D/3D data produced by the second node in the workflow against the commonality from the modeling; and halting execution of the workflow in response to the third state of the 2D/3D data differing from the commonality by more than a threshold amount.

13. The method of claim 10 further comprising:

detecting one or more anomalous results in the second state of the 2D/3D data; and halting execution of the workflow after executing the one or more operations associated with the first node in response to the detecting of the one or more anomalous results.

14. An editing system comprising:

one or more hardware processors configured to:

receive a workflow comprising a plurality of nodes, each node of the plurality of nodes being associated with one or more operations that perform a different manipulation of two-dimensional or three-dimensional ("2D/3D") data;

access a plurality of applications, each application of the plurality of applications comprising a function that implements the one or more operations of a node on the 2D/3D data in at least one of a plurality of different states;

determine that the one or more operations associated with a first node of the plurality of nodes are implemented by a first function of a first application from the plurality of applications when the 2D/3D data has a first state, and are implemented by a second function of a second application from the plurality of applications when the 2D/3D data has a second state;

execute the first node by invoking the first function of the first application over the second function of the second application that are both associated with the first node based on the 2D/3D data having the first state that maps to the first function of the first application and not the second function of the second application;

determine that the 2D/3D data is converted from a first format to a different second format that is associated with the second state of the 2D/3D data in response to the executing of the first node; and execute a second node that is after the first node in the workflow by invoking a third function of the second application that implements the one or more operations associated with the second node based on the 2D/3D data in the different second format being associated with the second state that is compatible with functions of the second application and that is incompatible with functions of the first application.

15. The editing system of claim 14, wherein the one or more hardware processors are further configured to:

provide a user interface ("UI") comprising a visual representation for each node of the plurality of nodes;

drag and drop the visual representation for each node of the plurality of nodes in a particular order based on a user input provided via the UI; and define the workflow in response to the particular order of the visual representation for each node of the plurality of nodes in the UI.

16. The editing system of claim 14, wherein the one or more hardware processors are further configured to:

map the first node of the workflow to the first function of the first application based on the 2D/3D data of the first format being provided as the input to the first node and the functions of the first application applying to the 2D/3D data of the first format; and map the second node of the workflow to the third function of the second application based on the 2D/3D data of the second format being provided as input to the second node and the functions of the second application applying to the 2D/3D data of the second format.

17. The editing system of claim 14, wherein the one or more hardware processors are further configured to:

present a user interface comprising the plurality of nodes;

add the first node to the workflow in response to a user input; and filter the plurality of nodes that are presented in the user interface by disabling a set of the plurality of nodes from the user interface in response to the one or more operations associated with the first node converting the 2D/3D data in the first format to the second format and the set of the plurality of nodes comprising functions that are incompatible with the 2D/3D data in the second format.

18. The editing system of claim 14, wherein executing the first node comprises:

performing the one or more operations associated with the first node on the 2D/3D data in the first format at a full resolution over a first time;

performing the one or more operations associated with the first node on the 2D/3D data in the first format at a lower resolution over a second time, wherein the lower resolution is less than the full resolution, and wherein the second time spans a first part of the first time and is less than the first time; and presenting a preview of output that is generated by the first node at an end of the second time based on results from the performing of the one or more operations on the 2D/3D data at the lower resolution while continuing the performing of the one or more operations on the 2D/3D data at the full resolution.

19. The editing system of claim 14, wherein the one or more hardware processors are further configured to:

store the 2D/3D data modified from the first state to the second state with the first node after the executing of the first node, wherein the 2D/3D data modified from the first state to the second state corresponds to the 2D/3D data in the second format that is output as a result of applying the one or more operations associated with the first node to the 2D/3D data; and store the 2D/3D data modified from the second state to a third state with the second node after the executing of the second node, wherein the 2D/3D data modified from the second state to the third state corresponds to the 2D/3D data in a third format that is output as a result of applying the one or more operations associated with the second node to the 2D/3D data.

20. A non-transitory computer-readable medium storing program instructions that, when executed by one or more hardware processors of an image editing system, cause the image editing system to perform operations comprising:

receive a workflow comprising a plurality of nodes, each node of the plurality of nodes being associated with one or more operations that perform a different manipulation of two-dimensional or three-dimensional ("2D/3D") data;

access a plurality of applications with the editing system, each application of the plurality of applications comprising a function that implements the one or more operations of a node the on 2D/3D data of a different format in at least one of a plurality of different states;

determine that the one or more operations associated with a first node of the plurality of nodes are implemented by a first function of a first application from the plurality of applications when the 2D/3D data has a first state, and are implemented by a second function of a second application from the plurality of applications when the 2D/3D data has a second state;

execute the first node by invoking the first function of the first application over the second function of the second application that are both associated with the first node based on the 2D/3D data having the first state that maps to the first function of the first application and not the second function of the second application;

determine that the 2D/3D data is converted from a first to a different second format that is associated with the second state of the 2D/3D data in response to the executing of the first node; and execute a second node that is after the first node in the workflow by invoking a third function of the second application that implements the one or more operations associated with the second node based on the 2D/3D data in the different second format being associated with the second state that is compatible with functions of the second application and that is incompatible with functions of the first application.

\* \* \* \* \*